United States Patent
Son et al.

(10) Patent No.: US 11,380,888 B2
(45) Date of Patent: *Jul. 5, 2022

(54) ELECTRODE AND LITHIUM SECONDARY BATTERY COMPRISING SAME

(71) Applicants: LG ENERGY SOLUTION, LTD., Seoul (KR); KOREA ADVANCED INSTITUTE OF SCIENCE AND TECHNOLOGY, Daejeon (KR)

(72) Inventors: Byoungkuk Son, Daejeon (KR); Jang Wook Choi, Daejeon (KR); Byung Gon Kim, Daejeon (KR); Minchul Jang, Daejeon (KR); Eunkyung Park, Daejeon (KR); Junghun Choi, Daejeon (KR); Donghyeon Kang, Daejeon (KR)

(73) Assignees: LG ENERGY SOLUTION, LTD., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 14 days.

This patent is subject to a terminal disclaimer.

(21) Appl. No.: 16/368,149

(22) Filed: Mar. 28, 2019

(65) Prior Publication Data

US 2019/0229342 A1  Jul. 25, 2019

Related U.S. Application Data

(63) Continuation of application No. PCT/KR2018/003074, filed on Mar. 16, 2018.

(30) Foreign Application Priority Data

Mar. 16, 2017 (KR) .................. 10-2017-0033415
Mar. 15, 2018 (KR) .................. 10-2018-0030476

(51) Int. Cl.
*H01M 4/36* (2006.01)
*H01M 4/76* (2006.01)
(Continued)

(52) U.S. Cl.
CPC ............. *H01M 4/366* (2013.01); *H01M 4/13* (2013.01); *H01M 4/134* (2013.01); *H01M 4/382* (2013.01);
(Continued)

(58) Field of Classification Search
CPC ........ H01M 4/13; H01M 4/134; H01M 4/366; H01M 4/384; H01M 4/583; H01M 4/622;
(Continued)

(56) References Cited

U.S. PATENT DOCUMENTS

| 5,401,598 A | 3/1995 | Miyabayashi et al. |
| 2002/0048644 A1* | 4/2002 | Han .................. C01B 32/05 |
| | | 428/36.9 |

(Continued)

FOREIGN PATENT DOCUMENTS

| EP | 3486982 A1 | 5/2019 |
| JP | 09045312 A * | 2/1997 |

(Continued)

OTHER PUBLICATIONS

EPO Website (www.espacenet.com) machine translation of the detailed description of JP-09045312-A. (Year: 1997).*

(Continued)

*Primary Examiner* — Gregg Cantelmo
(74) *Attorney, Agent, or Firm* — Birch, Stewart, Kolasch & Birch, LLP

(57) ABSTRACT

An electrode and a lithium secondary battery including the same. By preparing an electrode including an electrode active layer formed using a structure capable of supporting an electrode active material, safety and charge and discharge
(Continued)

properties of a battery are improved due to morphological characteristics of the electrode active material being supported inside the structure.

14 Claims, 9 Drawing Sheets

(51) Int. Cl.
| | |
|---|---|
| *H01M 10/052* | (2010.01) |
| *H01M 4/62* | (2006.01) |
| *H01M 4/583* | (2010.01) |
| *H01M 4/66* | (2006.01) |
| *H01M 4/38* | (2006.01) |
| *H01M 4/134* | (2010.01) |
| *H01M 4/13* | (2010.01) |
| *H01M 4/02* | (2006.01) |

(52) U.S. Cl.
CPC ............ *H01M 4/583* (2013.01); *H01M 4/622* (2013.01); *H01M 4/625* (2013.01); *H01M 4/626* (2013.01); *H01M 4/661* (2013.01); *H01M 4/663* (2013.01); *H01M 4/765* (2013.01); *H01M 10/052* (2013.01); *H01M 2004/027* (2013.01)

(58) Field of Classification Search
CPC ...... H01M 4/625; H01M 4/626; H01M 4/661; H01M 4/663; H01M 4/382; H01M 6/625; H01M 10/052; H01M 2004/027; H01M 4/587

See application file for complete search history.

(56) References Cited

U.S. PATENT DOCUMENTS

| | | | |
|---|---|---|---|
| 2004/0175844 A1* | 9/2004 | Yang | H01L 21/02458 438/2 |
| 2006/0013756 A1* | 1/2006 | Siochi | H01L 51/0048 423/447.1 |
| 2009/0117468 A1* | 5/2009 | Eom | B82Y 30/00 429/231.8 |
| 2009/0305135 A1* | 12/2009 | Shi | H01M 4/625 429/217 |
| 2010/0330421 A1 | 12/2010 | Cui et al. | |
| 2012/0077142 A1 | 3/2012 | Maurer et al. | |
| 2012/0094181 A1* | 4/2012 | Kim | H01M 4/386 429/231.4 |
| 2012/0100438 A1 | 4/2012 | Fasching et al. | |
| 2013/0130115 A1 | 5/2013 | Park et al. | |
| 2013/0181172 A1 | 7/2013 | Nishi et al. | |
| 2014/0057171 A1 | 2/2014 | Sohn et al. | |
| 2014/0234732 A1 | 8/2014 | Park et al. | |
| 2016/0056501 A1 | 2/2016 | Ryu et al. | |
| 2016/0315313 A1 | 10/2016 | Suzuki et al. | |

FOREIGN PATENT DOCUMENTS

| | | | |
|---|---|---|---|
| JP | 10247495 A | * | 8/1998 |
| JP | 10-321218 A | | 12/1998 |
| JP | 2005-174755 A | | 6/2005 |
| JP | 2012-528164 A | | 11/2012 |
| JP | 2012-528463 A | | 11/2012 |
| JP | 2013-110112 A | | 6/2013 |
| JP | 2016-115417 A | | 6/2016 |
| JP | 2016-207637 A | | 12/2016 |
| KR | 10-0447792 B1 | | 9/2004 |
| KR | 10-2013-0106238 A | | 9/2013 |
| KR | 10-2014-0001905 A | | 1/2014 |
| KR | 10-2014-0026193 A | | 3/2014 |
| KR | 10-1417268 B1 | | 7/2014 |
| KR | 10-1561188 B1 | | 10/2015 |
| KR | 10-2016-0029475 A | | 3/2016 |
| KR | 10-2016-0032807 A | | 3/2016 |
| KR | 10-2016-0064899 A | | 6/2016 |
| KR | 10-2016-0089954 A | | 7/2016 |
| WO | WO 02/061863 A1 | | 8/2002 |
| WO | WO 2012/020561 A1 | | 2/2012 |

OTHER PUBLICATIONS

EPO website machine translation of the detailed description of JP 10-247495A. (Year: 1998).*
Extended European Search Report for European Application No. 18768524.3, dated Nov. 19, 2019.
Huang et al., "Carbon Nanotube-Encapsulated Noble Metal Nanoparticle Hybrid as a Cathode Material for Li-Oxygen Batteries," Advanced Functional Materials, vol. 24, 2014, pp. 6516-6523.
International Search Report (PCT/ISA/210) issued in PCT/KR2018/003074, dated Jun. 29, 2018.
Yan et al., "Selective deposition and stable encapsulation of lithium through heterogeneous seeded growth", Nature Energy, 2016, Article No. 16010, pp. 1-8.

* cited by examiner

[Figure 1a]
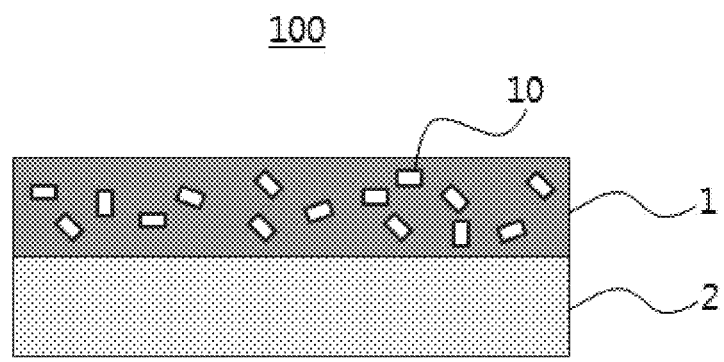
[Figure 1b]
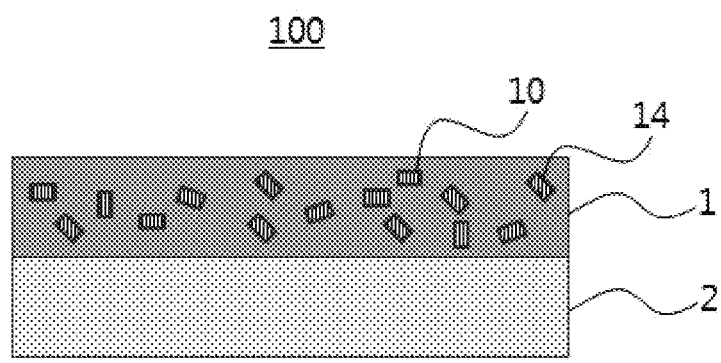

[Figure 2a]
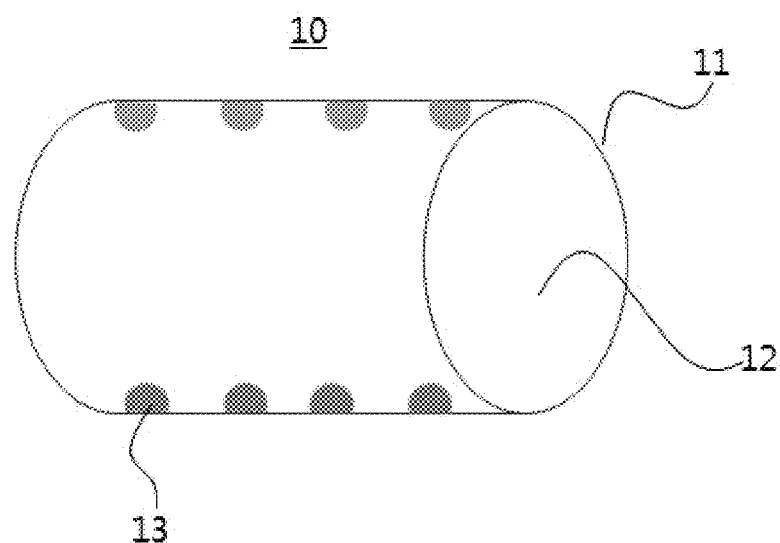
[Figure 2b]
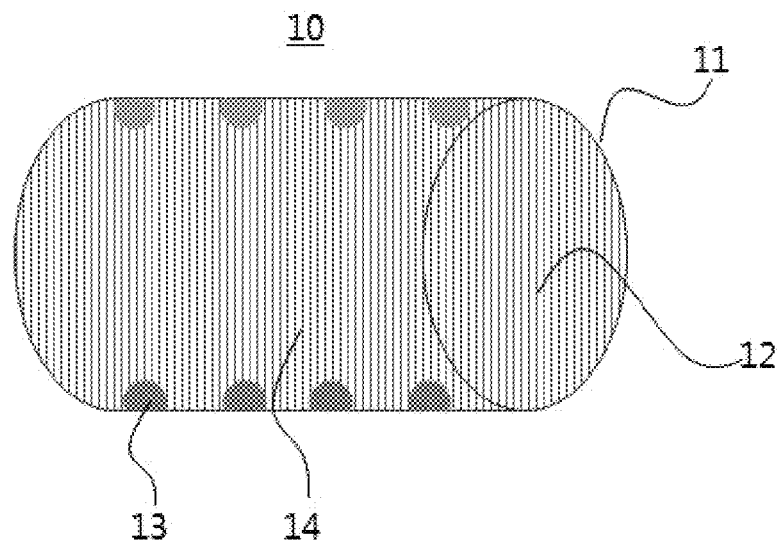

[Figure 3a]
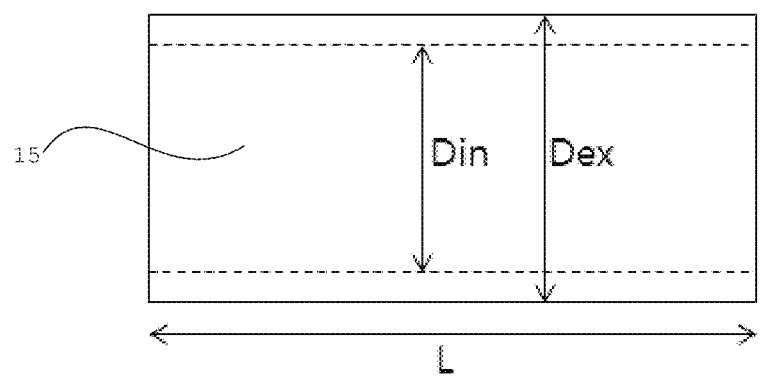
[Figure 3b]
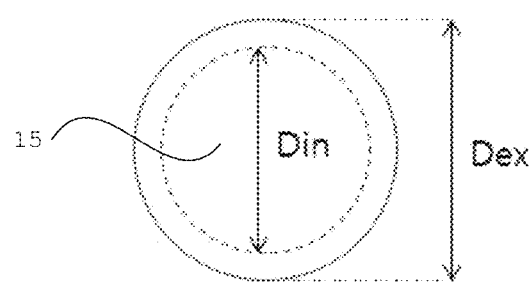

[Figure 4]
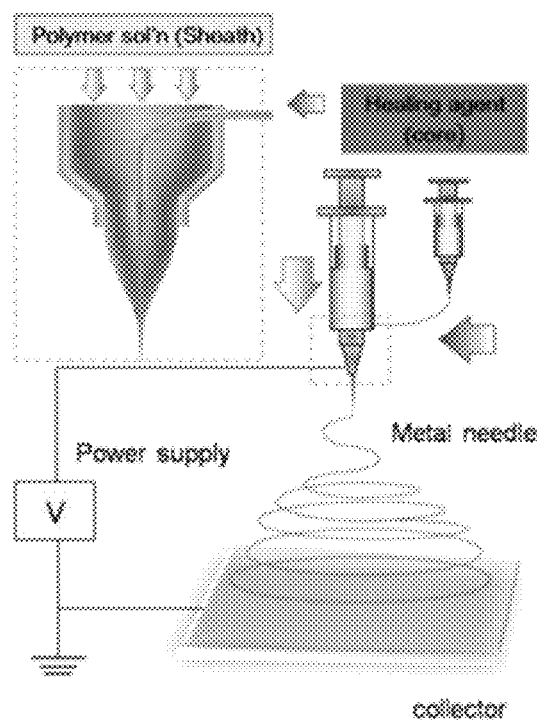

[Figure 5a]
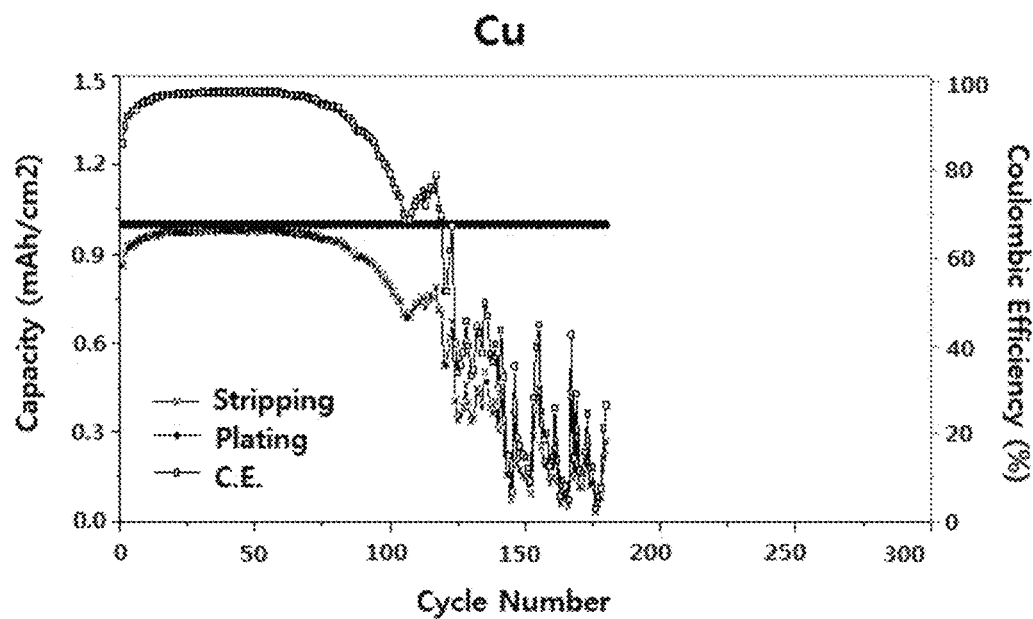

[Figure 5b]
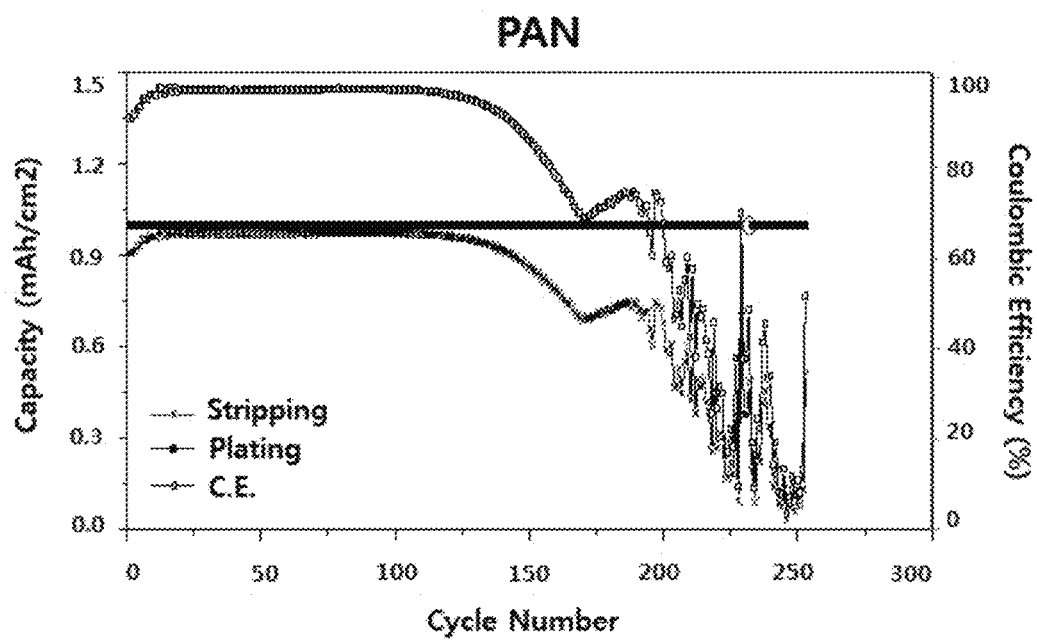

[Figure 5c]
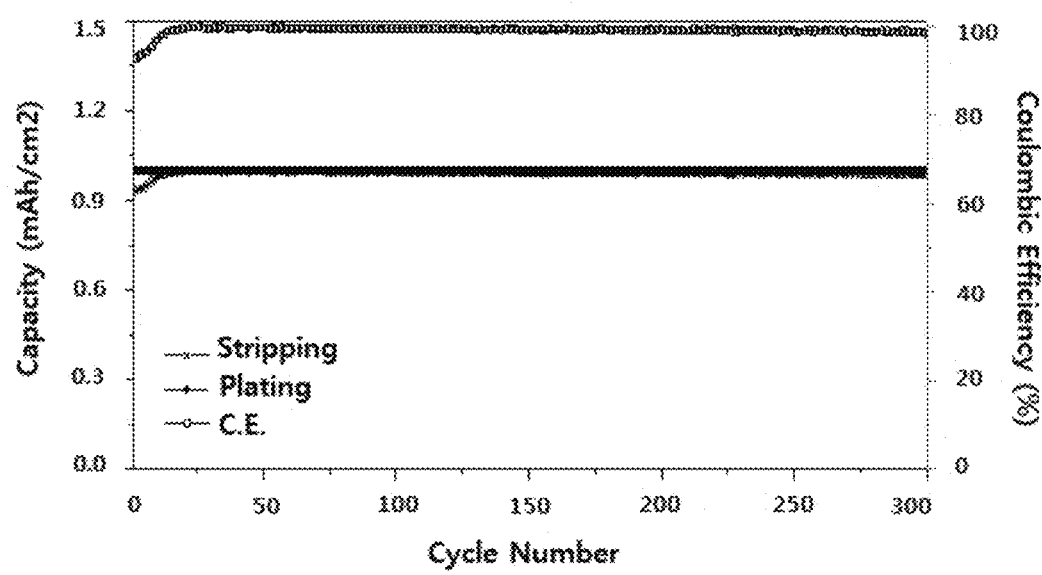

[Figure 6]
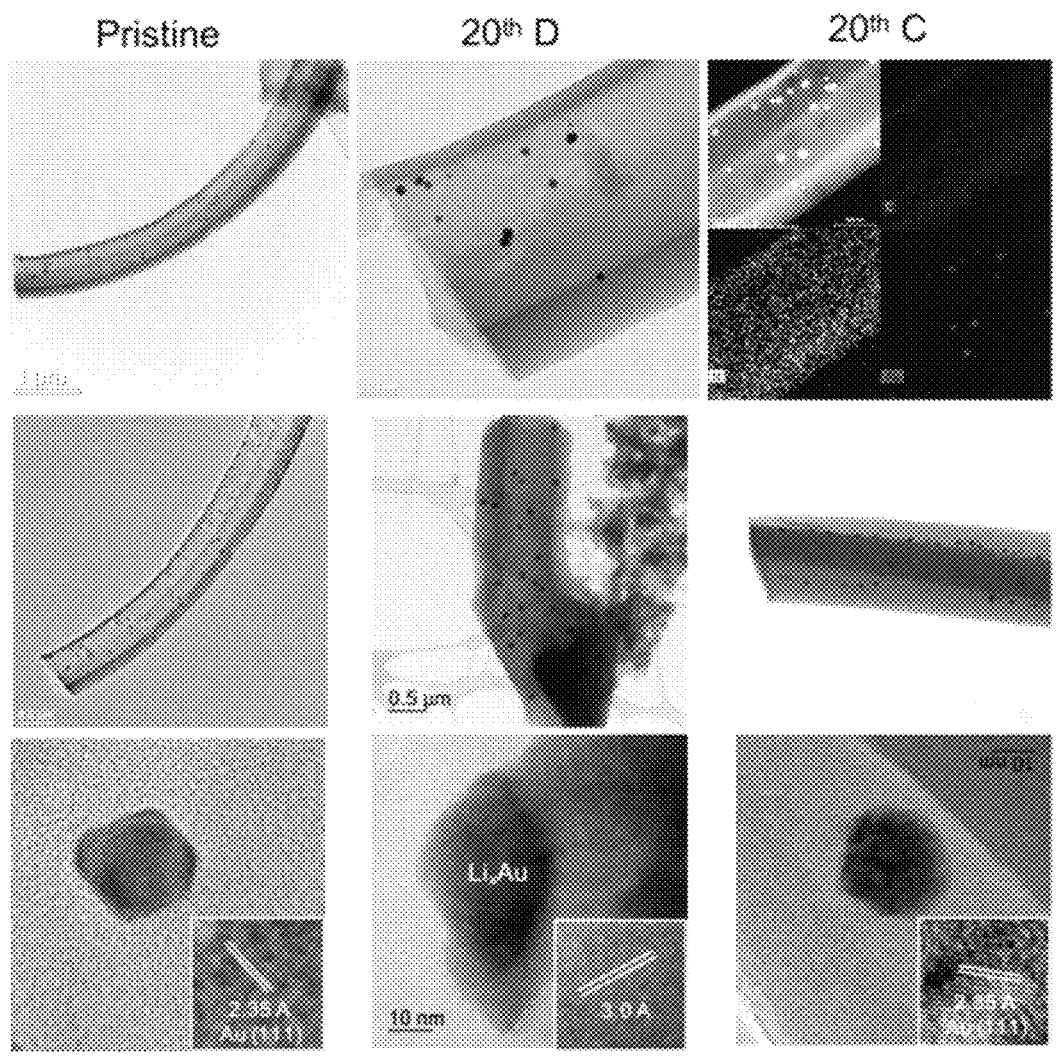

[Figure 7]
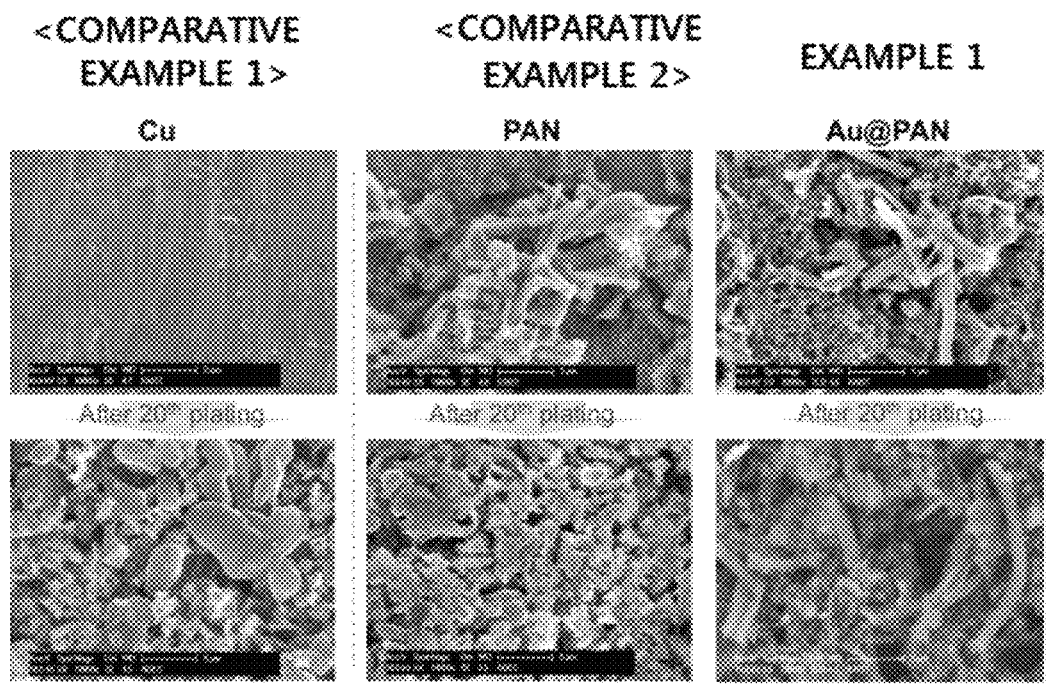

ELECTRODE AND LITHIUM SECONDARY BATTERY COMPRISING SAME

CROSS REFERENCE TO RELATED APPLICATIONS

This application is a Continuation of PCT International Application No. PCT/KR2018/003074, filed on Mar. 16, 2018, which claims priority under 35 U.S.C. 119(a) to Patent Application Nos. 10-2017-0033415, filed in the Republic of Korea on Mar. 16, 2017 and 10-2018-0030476, filed in the Republic of Korea on Mar. 15, 2018, all of which are hereby expressly incorporated by reference into the present application.

TECHNICAL FIELD

The present invention relates to an electrode capable of being used as a positive electrode or a negative electrode of a lithium secondary battery, a lithium secondary battery including the same, and a method of preparing the same.

BACKGROUND ART

With recent developments in the electronics industry, electronic devices have become smaller and lighter, and the use of portable electronic devices has increased therefrom. The necessity of secondary batteries having high energy density has increased as a power supply of such portable electronic devices and studies on lithium secondary batteries have been actively ongoing.

Lithium metal has a high theoretical capacity of 3,862 mAh/g, and a low standard electrode potential (−3.04 vs SHE), which makes it an ideal material as a negative electrode of high energy density lithium secondary batteries. However, lithium metal has not been commercialized as a negative electrode material of lithium batteries due to safety problems occurring from internal short circuits of the batteries caused by lithium dendrite growth and the like. In addition, lithium metal produces a side reaction with an active material or an electrolyte greatly affecting short circuit and lifespan of batteries. Accordingly, technologies of stabilizing lithium metal electrode, and preventing a battery capacity decrease and enhancing battery safety through dendrite suppression are core technologies that need to precede the development of next-generation lithium secondary batteries.

Various-formed electrode active materials and electrodes have been continuously studied for preventing a battery capacity decrease and enhancing battery safety.

For example, a negative electrode active material in which Au is deposited on an inner surface of a cavity-shaped capsule, and with the Au as a seed, inside the cavity-shaped capsule is filled with lithium metal has been developed (Nature Energy 1, Article number: 16010 (2016), "Selective deposition and stable encapsulation of lithium through heterogeneous seeded growth"). The cavity-shaped capsule-formed negative electrode active material is capable of securing stability in a liquid electrolyte due to its closed shape, however, the volume of lithium metal filling inside the cavity-shaped capsule is not readily controlled, and a problem of reducing electrical conductivity may occur when forming an electrode due to its spherical shape.

In addition, a technology on a lithium electrode having a form of being prepared as a three-dimensional porous structure and then filling the pores with lithium metal or lithium alloys has been disclosed (Korean Patent No. 1417268). In the lithium electrode, reactions occur in the pores of the porous structure as well as on a surface of the lithium electrode, and as a result, charge and discharge cycle properties of a lithium metal battery are enhanced and output properties are enhanced.

As described above, technologies have been continuously developed in order for preventing a battery capacity decrease and enhancing charge and discharge performance, however, technology development for satisfying safety as well as making improvements on functional aspects of a battery has been continuously required.

PRIOR ART DOCUMENTS

Patent Documents (Patent Document 0001) Korean Patent No. 1417268, "lithium electrode for lithium metal battery and method for manufacturing the same"

(Patent Document 0002) Korean Patent No. 0447792, "lithium electrode using porous three-dimensional current collector, method for manufacturing the same and lithium battery"

Non-Patent Documents (Non-Patent Document 001) Yan, et al., Nature Energy 1, Article number: 16010 (2016), "Selective deposition and stable encapsulation of lithium through heterogeneous seeded growth"

DISCLOSURE

Technical Problem

As a result of extensive studies in view of the above, one embodiment of the present invention relates to an electrode including a structure capable of supporting an electrode active material in a form of being dispersed into an electrode active layer, whereby charge and discharge performance of a battery is enhanced by controlling capacity of the electrode active material supported inside the structure, and dendrite growth in the electrode is prevented due to morphological characteristics of the electrode active material-supported structure, which improves safety of the battery as well.

Accordingly, one embodiment of the present invention is directed to providing an electrode capable of improving safety as well as a functional aspect such as battery capacity and charge and discharge performance.

Another embodiment of the present invention is directed to providing a lithium secondary battery including such an electrode.

Technical Solution

In view of the above, one embodiment of the present invention provides an electrode comprising a current collector; and an electrode active layer that comprises a structure capable of supporting an electrode active material, wherein the electrode active layer is formed on the current collector.

Another embodiment of the present invention provides a lithium secondary battery including the electrode.

Advantageous Effects

In one embodiment, an electrode according to the present invention, a structure for supporting an electrode active material is dispersed into an electrode active layer, and the structure is capable of performing a role of an electrode active material in both states of having an electrode active material not supported therein and having an electrode active material supported therein, and therefore, charge and discharge performance can be enhanced by morphological characteristics of the structure having a tube shape.

In addition, an electrode active material is supported inside the structure, and dendrite growth and a reaction between the electrode active material and a liquid electrolyte may be prevented in an electrode, and therefore, safety of the electrode can be improved.

In addition, in one embodiment, a metal, formed on an inner surface of the structure included in the electrode active layer, allows the electrode active material to form around the metal, and therefore, is capable of preventing growth in a dendrite form, and is also capable of enhancing battery safety by preventing a reaction with a liquid electrolyte.

Specifically, the structure itself may be used as a negative electrode active material or used as a negative electrode active material while having lithium metal supported therein.

Furthermore, the structure is a tube-shaped structure having an aspect ratio of greater than 1, and the tube shape itself having an aspect ratio of greater than 1 can be an electrical conduction pathway.

DESCRIPTION OF DRAWINGS

FIGS. 1a and 1b are mimetic diagrams of an electrode according to embodiments of the present invention.

FIGS. 2a and 2b are mimetic diagrams of a structure according to embodiments of the present invention (FIG. 2a: the structure before lithium metal is supported, FIG. 2b: the structure after lithium metal supported).

FIGS. 3a and 3b are respectively mimetic diagrams illustrating a longitudinal section and a transverse section of a tube in a structure according to one embodiment of the present invention.

FIG. 4 is a mimetic diagram of a dual-nozzle system as an electric radiation device used in preparing a structure according to one embodiment of the present invention.

FIGS. 5a to 5c show graphs of charge and discharge test results for lithium half-cells manufactured using negative electrodes of examples and comparative examples of the present invention.

FIG. 6 shows transmission electron microscopy (TEM) images observing form changes of a lithium half-cell manufactured using a negative electrode of Example 1 before and after charge and discharge (Pristine: before charge and discharge; $20^{th}$ D: after $20^{th}$ discharge; $20^{th}$ C: after $20^{th}$ charge).

FIG. 7 shows scanning electron microscope (SEM) images observing a form of lithium metal growth when charging lithium half-cells manufactured using negative electrodes of examples and comparative examples.

MODE FOR DISCLOSURE

Hereinafter, the present invention will be described in more detail for illuminating the present invention.

Terms or words used in the present specification and the claims are not to be interpreted limitedly to common or dictionary meanings, and shall be interpreted as meanings and concepts corresponding to technological ideas of the present invention based on a principle in which inventors may suitably define the concepts of terms in order to describe their own invention in the best possible way.

Electrode

One embodiment of the present invention relates to an electrode capable of being used as a positive electrode or a negative electrode of a lithium secondary battery, and for example, by including an electrode active material in a form supported in a structure for supporting the electrode active material in an electrode active layer of the electrode. The electrode is capable of enhancing charge and discharge performance of a lithium secondary battery and thereby strengthening a functional aspect of the battery, and in addition thereto, preventing dendrite growth in the electrode, and preventing a reaction between the electrode active material and a liquid electrolyte, and as a result, improving safety of the lithium secondary battery.

Hereinafter, the present invention will be described in more detail with reference to the accompanying drawings.

FIGS. 1a and 1b are mimetic diagrams of an electrode (100) according to embodiments of the present invention.

When referring to FIG. 1a, the electrode (100) may comprise an electrode active layer (1) comprising a structure (10) capable of supporting an electrode active material, and the electrode active layer (1) may be formed on a current collector (2).

When an electrode active material is not supported inside the structure (10), the electrode active layer (1) has a shape comprising a plurality of pores, and with such a form, charge and discharge performance may be enhanced. For example, a lithium negative electrode has a plane foil form in a lithium metal battery and thereby has poor charge and discharge properties, and a problem of short circuit occurs due to dendrite formation. However, when the electrode active layer (1) has a form including a plurality of pores, such a problem may be prevented. By the lithium metal electrode having pores, a specific surface area increases compared to the foil form enhancing a C-rate property of a battery.

In addition, when referring to FIG. 1b, dispersion into the electrode active layer (1) may occur in a state of supporting an electrode active material (14) inside the structure (10). FIG. 1b illustrates a form in which the electrode active material (14) is supported in the whole inside of the structure (10), however, the electrode active material (14) may be supported in a part of the inside of the structure (10). The number of cycles of a battery may be controlled depending on the degree of electrode active material being supported inside the structure (10), and a volume ratio of the supported electrode active material may be described later.

The structure (10) may function as an electrode active material even when the electrode active material (14) is not supported. For example, when the structure is included in a negative electrode of a lithium metal battery, lithium ions generated in a positive electrode migrate to the negative electrode as the lithium metal battery starts to drive even when lithium metal, an electrode active material, is not supported inside the structure. Lithium metal is plated inside the structure while the lithium ions transferred to the negative electrode are reduced, and the number of charge and discharge cycles may be determined by capacity of the plated lithium metal.

The current collector (2) performs a role of collecting electrons produced through an electrochemical reaction of an electrode active material or supplying electrons required for the electrochemical reaction, and may be one or more types selected from the group consisting of copper, stainless steel, aluminum, nickel, titanium and baked carbon. The stainless steel may be surface treated with carbon, nickel, titanium or silver.

The electrode active layer (1) may include a structure (10), a binder (not shown) and a conductor (not shown), and specifically, may include the structure (10) in 80% by weight to 99.5% by weight, the binder in 0.3% by weight to 19.8% by weight and the conductor in 0.2% by weight to 19.7% by weight, based upon the total weight of the electrode active layer.

The total weight of the structure (10) includes a weight including or not including an electrode active material included therein. For example, when lithium metal is supported in the structure (10) as an electrode active material, a sum of the weights of the structure (10) and the supported lithium metal may become the total weight of the structure (10), and when an electrode active material is not supported in the structure (10), the weight of the structure (10) may become the total weight of the structure (10).

When the weight % of the structure (10) is less than 80% by weight (of the total weight of the electrode active layer), charge and discharge properties of a battery may decline, and when the weight % is greater than 99.5% by weight, the content of the structure (10) relatively increases in slurry for forming the electrode active layer (1) compared to the binder or the conductor causing decline in the slurry coating property on the current collector (2), and formation of the electrode active layer (1) may be difficult.

Meanwhile, the structure may have a core-shell shape, and specifically, the core-shell-shaped structure may have a spherical shape or a tube shape.

Meanwhile, the tube-shaped structure may be a tube-shaped structure having an inner surface forming a cavity (15) and two ends (12, one shown), wherein one or both ends are open.

Hereinafter, embodiments of the structure comprised in the electrode according to the present invention comprising a tube having both ends open will be described in detail as an example.

FIGS. 2a and 2b are mimetic diagrams of a structure (10) according to embodiments of the present invention.

When referring to FIG. 2a, the structure (10) may comprise the tube (11) having both ends (12) open; and a metal (13) formed on an inner surface of the tube (11). The tube (11) has a shape with both ends (12) open, but it may have a shape with one end open. In FIG. 2b, there is additionally a lithium metal (14) formed on the metal (13).

FIGS. 3a and 3b are respectively mimetic diagrams illustrating a longitudinal section (FIG. 3a) and a transverse section (FIG. 3b) of the tube in the structure according to one embodiment of the present invention. Defined within the tube is a cavity (15).

When referring to FIGS. 3a and 3b, an aspect ratio (a) of the longitudinal section of the tube (11) may be greater than 1.

Herein, the aspect ratio of the longitudinal section of the tube (11) may be calculated by the following Equation 1.

$$a = L/D_{ex}$$ [Equation 1]

Herein, L is a length of the tube (11) and $D_{ex}$ is an outer diameter of the tube (11).

For example, the length of the tube (11) may be 2 μm to 25 μm, preferably 3 μm to 15 μm, and more preferably 4 μm to 10 μm. When the length of the tube is less than 2 μm, it may be difficult to implement the tube having an aspect ratio more than 1 by Equation 1. In addition, when the length of the tube is more than 25 μm, there may be a problem that the packing density is low and the pores of the electrode become large even after rolling, so that the energy density per cell volume becomes low.

The outer diameter ($D_{ex}$) of the tube (11) may be 0.2 μm to 2 μm, preferably 0.3 μm to 1.2 μm, more preferably 0.5 μm to 1 μm. When the outer diameter is less than 0.2 μm, the volume of the lithium metal (14) contained in the structure (10) is reduced, so that the lithium dendrite inhibiting effect and battery cycle lives are reduced and the specific capacity of the active material and the energy density per weight of the battery become lower. When the outer diameter is more than 2 μm, it is difficult to maintain the shape of the tube in the manufacturing process and the tube shape is broken even during the electrode manufacturing and rolling processes, so that the lithium dendrite inhibiting effect is lowered.

The actual dimensions of the tube (11), such as length L, outer diameter $D_{ex}$ and inner diameter $D_{in}$, may be measured with SEM (scanning electron microscope) or TEM (transmission electron microscope).

The structure (10) has a tube (11) shape having an aspect ratio of greater than 1 (a>1) as described above and the tube (11) may include a carbon-based polymer, and therefore, the structure (10) itself may function as an electrical conduction pathway.

In addition, the tube (11) has a cylindrical shape having one or both ends open, and the tube itself may become an electrical conduction pathway, and ion conductivity may be enhanced by liquid electrolyte wetting.

On the other hand, if the structure is a sphere-like hollow capsule, it is difficult to impregnate the electrolyte, to transfer lithium ions to the inside of the structure and to control the volume of the lithium metal filled in the structure, because of its closed shape compared to the tube having opened shape. In addition, if the structure is a sphere-like hollow capsule, there is a problem that the electric conductivity may be decreased because of its spherical shape, when the electrode is formed.

A shell of the tube (11) may exhibit electrical conductivity, and may also exhibit lithium ion conductivity.

Herein, the shell of the tube (11) may include carbon, and the carbon may be amorphous carbon.

In addition, the tube (11) and, in particular, the shell of the tube (11) may be porous. When the outer diameter of the tube increases, the thickness of the shell will increase to reinforce the strength. At this time, if there is a pore in the shell, the electrolyte can penetrate into the shell, so that the resistance of the battery may be reduced. The size of the pores may range from 2 nm to 200 nm, and it is preferred to have a porosity of 0% to 50% for maintaining the strength of the tube.

Meanwhile, the metal (13) may be included in a form of being formed on an inner surface of the tube (11), and the metal (13) may be included in 0.1% by weight to 25% by weight, preferably in 0.1% by weight to 15% by weight and more preferable in 0.5% by weight to 10% by weight based on the total weight of the structure (10), that is, the total weight of the tube (11) and the metal (13).

When the weight of the metal (13) is less than 0.1% by weight, sites for an electrode active material (14) to bind may not be sufficient, and when the weight is greater than 25% by weight, the amount of the metal (13) may become excessive resulting in a relative decrease in the amount of an electrode active material (14) to fill, and as a result, the specific capacity of the electrode active material (14) may decrease.

The metal (13) may be formed on an inner surface of the tube (11) in a particle form, and the metal (13) may be a particle having a particle diameter of 1 nm to 50 nm, preferably 5 nm to 40 nm and more preferably 10 nm to 30 nm. When the metal (13) has a particle diameter of less than 1 nm, areas for an electrode active material to bind are not sufficient, which may not induce smooth growth of the electrode active material, and when the particle diameter is greater than 50 nm, areas for metal (13) formation increase, thus, decreasing the specific capacity of the electrode active material.

In the present invention, the tube (11) may be suitable for supporting an electrode active material.

The electrode active material may be a positive electrode active material or a negative electrode active material commonly used.

The positive electrode active material may be an oxide formed with lithium and a transition metal having a structure capable of lithium intercalation, and for example, may be represented by the following Chemical Formula 1.

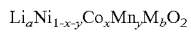
[Chemical Formula 1]

In Chemical Formula 1, a=1, 0.1≤x=0.3, 0.15≤y≤0.25 and 0≤b≤0.05, and M may be any one selected from among transition metals or lanthanide elements, for instance, selected from the group consisting of Al, Cr, Mn, Fe, Mg, La, Ce, Sr, V, Zn and combinations thereof.

Typical examples of the negative electrode active material may include graphite-based carbon, amorphous carbon such as non-graphitized carbon, crystalline carbon and the like, and may also use metal composite oxides such as $Li_xFe_2O_3$ (0=x≤1), $Li_xWO_2$ (0≤x≤1) and $Sn_xMe_{1-x}Me'_yO_z$ (Me: Mn, Fe, Pb, Ge; Me': Al, B, P, Si, elements of group 1, group 2 and group 3 in the periodic table, halogen; 0≤x≤1; 1≤y≤3; 1≤z=8); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers such as polyacetylene; Li—Co—Ni-based materials and the like, however, the material is not limited thereto, and negative electrode active materials commonly used may be used without limit. The metal (13) may be a metal having a low overvoltage with an electrode active material compared to an electrode current collector; or a metal having a multiphase with an electrode active material.

For example, when the electrode active material (14) is lithium metal, the metal having a low overvoltage compared to Cu (current collector) when forming the lithium metal may be one or more types selected from the group consisting of Au, Zn, Mg, Ag, Al, Pt, In, Co, Ni, Mn and Si as a metal having a low interfacial energy when reacting with the lithium metal, and the metal having a multiphase with the lithium metal may be Ca as a metal having a plurality of sites capable of reacting with the lithium metal.

Referring to FIG. 2b, one embodiment of the present invention relates to a structure (10) comprising a tube (11) having an inner surface forming a cavity and two ends (12), wherein one or both ends are open; a metal (13) included on the inner surface of the tube (11); and lithium metal (14) formed on the metal (13).

In the case of a lithium dendrite, the cycle efficiency is not good, because even if the lithium dendrite is suppressed, side reactions of the lithium dendrite with the electrolytic solution occur. Therefore, in the development of a battery with a long life, for instance, of 500 cycles or more, it may be more advantageous to apply the structure (10) including the lithium metal (14) to a negative electrode of a lithium metal battery as compared to the structure (10) not including the metal (14).

Detailed descriptions on an aspect ratio of the tube, physical properties of the tube exhibiting electrical conductivity and lithium ion conductivity, materials of a shell and a core, a composition and the metal are as described above.

At an interface between the metal (13) and the lithium metal (14), an alloy of the metal (13) and the lithium metal (14) may be formed. The alloy may be $Li_xAu$, and herein, x may be a real number of 0≤x≤3.75.

Meanwhile, a cavity (15, shown in FIGS. 3a and 3b) inside the tube (11) with the metal (13) formed therein may be filled with the lithium metal (14).

The lithium metal (14) may fill up inside the cavity (15) while growing through bonding to the metal (13), and a volume of the lithium metal (14) filling inside the cavity (15) may be calculated by the following Equation 2, a volume ratio (α) of the lithium metal with respect to a free volume of the tube (11), which is 0=α≤|1|MCA1.

$$\alpha = V_{Li}/V_F \qquad \text{[Equation 2]}$$

In Equation 2, $V_F$ is a free volume of the tube and $V_{Li}$ is a volume of the lithium metal, and the $V_F$ is calculated by the following Equation 3:

$$V_F = \Pi(D_{in}/2)^2 L \qquad \text{[Equation 3]}$$

In Equation 3, $D_{in}$ is an inner diameter of the tube and L is a length of the tube.

As the α value increases in the range (e.g., 0≤α≤1), a volume of the lithium metal (14) included in the structure (10) increases, and accordingly, a cycle life of a battery may be enhanced.

When α=0, lithium metal (14) is not formed while the structure (10) includes a tube (11) and a metal (13) formed on an inner surface of the tube (11), and lithium metal may be formed by electroplating and the like while the structure (10) is prepared into slurry by being mixed with a conductor and a binder, and the mixture is coated on a current collector.

For example, the length of the tube (11) may be 2 μm to 25 μm, preferably 3 μm to 15 μm, and more preferably 4 μm to 10 μm. When the length of the tube is less than 2 μm, it may be difficult to implement the tube having an aspect ratio more than 1 by Equation 1. In addition, when the length of the tube is more than 25 μm, there may be a problem that the packing density is low and the pores of the electrode become large even after rolling, so that the energy density per cell volume becomes low.

The inner diameter ($D_{in}$) of the tube (11) may be 0.1 μm to 1.8 μm, preferably 0.2 μm to 1.1 μm, more preferably 0.4 μm to 0.9 μm. When the inner diameter is less than 0.1 μm, the volume of the lithium metal (14) contained in the structure (10) may be reduced, so that the lithium dendrite inhibiting effect and battery cycle lives are reduced and the specific capacity of the active material and the energy density per weight of the battery become lower. When the inner diameter is more than 1.8 μm, it may be difficult to maintain the shape of the tube in the manufacturing process and the tube shape is broken even during the electrode manufacturing and rolling processes, so that the lithium dendrite inhibiting effect is lowered.

The binder performs the role of enhancing adhesion between electrode active material particles and adhesive strength between the electrode active material and the current collector. Aqueous binders commonly used in compositions for forming an electrode active layer may be used without particular limit.

The aqueous binder may be one or more types selected from the group consisting of acrylate-based rubber and styrene-based rubber, and specifically, may be styrene-based rubber such as styrene-butadiene rubber (SBR), acrylate-styrene-butadiene copolymer rubber (acrylate-co-SBR) or acrylonitrile-styrene-butadiene copolymer rubber (acrylonitrile-co-SBR); or an acrylate-based compound such as a copolymer of methyl methacrylate-lithium methacrylate (MMA-co-LiMA) or a copolymer of alkyl acrylate-acrylonitrile-acrylic acid (alkyl acrylate-co-acrylonitrile-acrylic acid), and the like, and these may be used either alone or as a mixture of two or more types.

More specifically, the aqueous binder may be styrene-butadiene-based rubber. The styrene-butadiene-based rubber enhances dispersibility of the electrode active material and the conductor in the composition and has high adhesive strength, and therefore, may resultantly decrease the content of the binder. In addition, the content of the electrode active material relatively increases with the decrease in the binder content, and a high capacity lithium secondary battery may be obtained. The styrene-butadiene-based rubber is also capable of enhancing overall properties of a battery by enhancing structural stability of an electrode. More specifically, the styrene-butadiene-based rubber may be styrene-butadiene rubber (SBR) having an average particle diameter (D50) of 90 nm to 150 nm and tensile strength of 90 kgf to 160 kgf. The styrene-butadiene-based rubber satisfying the above-mentioned average particle diameter and the physical properties may exhibit more superior adhesive strength. In the present invention, the average particle diameter (D50) of the styrene-butadiene-based rubber may be defined as a particle diameter based on 50% in the particle diameter distribution, and the average particle diameter (D50) may be measured using a laser diffraction method commonly used in the art.

When the content of the binder is less than 0.3% by weight, sufficient adhesive strength may be difficult to obtain in an electrode, and when the content is greater than 19.8% by weight, a capacity property of a battery may decline, and therefore, the content of the binder included in the electrode active layer (1) may be from 0.3% by weight to 19.8% by weight.

The conductor is used for providing conductivity to the electrode and may be used without particular limit as long as it has conductivity without inducing chemical changes.

The conductor may be one or more types selected from the group consisting of graphite; carbon-based materials; metal powders or metal fibers; conductive whiskers; conductive metal oxides; and conductive polymers, and specific examples thereof may include graphite such as natural graphite or artificial graphite; carbon-based materials such as carbon black, acetylene black, Ketjen black, channel black, furnace black, lamp black, thermal black and carbon fiber; powders or fibers of metals such as copper, nickel, aluminum and silver; needle-shaped or branched-shaped conductive whiskers such as a zinc oxide whisker, a potassium carbonate whisker, a titanium dioxide whisker, a silicon oxide whisker, a silicon carbide whisker, an aluminum borate whisker, a magnesium borate whisker, a potassium titanate whisker, a silicon nitride whisker, a silicon carbide whisker and an alumina whisker; conductive metal oxides such as titanium oxide; or conductive polymers such as polyphenylene derivatives, and these may be used either alone or as a mixture of two or more types. Among these, the conductor may be a carbon-based material, and more specifically, may be a carbon-based material including any one or a mixture of two or more selected from the group consisting of carbon black, acetylene black, Ketjen black, channel black, furnace black, lamp black, thermal black and carbon fiber when considering the significance of improvement effects obtained from the use of the conductor and a high temperature drying process in the electrode preparation process.

The conductor may have an average particle diameter (D50) of approximately a few hundred nanometers. Specifically, the conductor may have an average particle diameter (D50) of 20 nm to 1 µm. When the conductor has an average particle diameter (D50) of greater than 1 µm, dispersibility in the composition for forming an electrode may be low, and as a result, a conduction pathway of the conductor may not be readily formed in the electrode active layer causing a concern of conductivity decline, and in addition thereto, energy density of the electrode may decrease due to a structural property of being bulky. More specifically, the conductor may have an average particle diameter (D50) of 0.4 µm to 0.9 µm.

In the present invention, the average particle diameter (D50) of the conductor may be defined as a particle diameter based on 50% in the particle diameter distribution, and the average particle diameter (D50) may be measured using a laser diffraction method commonly used in the art.

When the content of the conductor is less than 0.2% by weight, an improvement in the conductivity obtained from the use of the conductor and an effect of improving a cycle property obtained therefrom may be insignificant, and when the content is greater than 19.7% by weight, a reaction between the conductor and a liquid electrolyte may increase due to an increase in the size of a specific surface area of the conductor causing a concern of declining a cycle property, and therefore, the content of the conductor included in the electrode active layer (1) may be from 0.2% by weight to 19.7% by weight.

According to another embodiment of the present invention, the electrode is a negative electrode, and the active material capable of being supported inside the tube-shaped structure may be lithium metal as a negative electrode active material.

Method for Preparing Electrode

The present invention also relates to a method for preparing an electrode, and the method for preparing an electrode may include (A) forming slurry for forming an electrode active layer by mixing a structure, a binder, a conductor and a solvent; (B) forming a film by coating the slurry on an electrode current collector; and (C) drying the film, and may further include (P) supporting an electrode active material inside the structure after the step (B).

Hereinafter, the method for preparing an electrode according to the present invention will be described in more detail for each step.

Step (A)

Amounts of the structure, the binder and the conductor that are starting materials for forming slurry for forming an electrode active layer in the step (A), and specific types of the binder and the conductor are the same as described above.

In addition, the structure may be prepared using a method for preparing a structure including steps of (S1) to (S4) to be described later.

The solvent may be one or more types selected from the group consisting of dimethyl sulfoxide (DMSO), alcohol, N-methylpyrrolidone (NMP), acetone and water, and may be removed during the drying process.

Step (B)

In the step (B), an electrode active layer film may be formed by coating the slurry formed in the step (A) on an electrode current collector.

The electrode current collector capable of being used herein is the same as described above.

In addition, the method of coating the slurry may include bar coating, spin coating, roll coating, slot die coating, spray coating or the like, and among these, any one or a mixed method of two or more may be used. In addition, when coating the slurry, the slurry may be coated to a proper thickness considering a loading amount and a thickness of an electrode active material in the finally prepared electrode active layer.

Step (C)

In the step (C), the film formed on the electrode current collector is dried to remove moisture included in an electrode as much as possible while vaporizing the solvent included in the film, and at the same time, to enhance binding strength of the binder.

The drying process may be carried out at a temperature higher than or equal to a boiling point of the solvent and lower than or equal to a melting point of the binder using a method of heating, hot-air injection and the like. The drying process may be carried out for 1 hour to 50 hours under a pressure of 10 torr or lower at preferably from 100° C. to 150° C. and more preferably from 100° C. to 120° C.

In addition, after the drying process, a rolling process is additionally carried out using a common method, and then an electrode may be prepared.

Step (P)

Meanwhile, after the step (B) and before the step (C), the step (P) supporting an electrode active material inside the structure included in the film formed in the step (B) may be additionally included.

Herein, the electrode active material may be a positive electrode active material or a negative electrode active material as described above.

The method of supporting an electrode active material inside the structure may be electroplating, however, the method is not limited thereto as long as it is a method capable of forming the electrode active material.

For example, when the electrode active material is lithium metal, the inside of the tube may be filled with the lithium metal as the lithium metal starts to be formed by being bonded to a metal on an inner surface of the tube. Accordingly, a phenomenon of the lithium metal growing to a dendrite form may be prevented, and inside the tube is filled with the lithium metal without the lithium metal growing in a dendrite form, and therefore, interfacial stability is strengthened preventing a reaction with a liquid electrolyte.

Herein, a lithium source for forming the lithium metal may be one or more types selected from the group consisting of lithium salts, lithium ingot and lithium metal oxides, but is not limited thereto as long as it is a compound capable of providing lithium ions.

The lithium salt may be one or more types selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiN(CaF_{2a+1}SO_2)(CbF_{2b+1}SO_2)$ (wherein a and b are natural numbers, and preferably $1 \leq a \leq 20$ and $1 \leq b \leq 20$), LiCl, LiI and $LiB(C_2O_4)_2$.

The lithium metal oxide may be one or more types selected from the group consisting of $LiMO_2$(M=Co, Ni, Mn), $Li_{1+x}Mn_{2-x}O_4^+$ ($0 \leq x \leq 0.3$) and $LiNi_{1-x}M_xO_2$ (M=Co, Mn, Al, Cu, Fe, Mg, B or Ga, and $0.01 \leq x \leq 0.3$). For example, the lithium metal oxide may be $LiCoO_2$, $LiNiO_2$, $LiMn_2O_4$, $Li(Ni_aMn_bCo_c)O_2$ (a+b+c=1), $LiNi_{0.5}Mn_{1.5}O_4$ or $LiNi_{0.5}Mn_{0.5}O_2$.

The electrode including an electrode active layer in which a structure having lithium metal supported therein is dispersed as above may be particularly suitable as a negative electrode of a lithium metal battery, and is capable of solving problems of lithium metal dendrite formation, a chronic problem of existing lithium metal batteries, and interfacial instability caused therefrom.

By supporting a positive electrode active material or a negative electrode active material as described above in the structure included in the electrode active layer, the electrode may be widely used in various types of batteries.

The present invention also relates to a method for preparing a structure including (S1) forming a tube precursor by electric radiating a metal precursor solution and a carbon-based polymer solution; (S2) first heat treating the tube precursor; (S3) second heat treating the first heat treated tube precursor; and (S4) forming lithium metal inside the tube obtained in (S3).

In the method for preparing a structure according to the present invention, heat treating temperatures of the first heat treatment and the second heat treatment are all different, and the second heat treating temperature is relatively higher than the first heat treating temperature.

Hereinafter, the method for preparing a structure according to the present invention will be described in detail for each step.

In the step (S1), a tube precursor may be formed by electric radiating a metal precursor solution and a carbon-based polymer solution.

Electric radiation may be carried out through an electric radiation method using a dual nozzle including inner side and outer side nozzles, and may be carried out in a voltage range of 10 kV to 20 kV and a tip to collector distance (TCD) of 5 cm to 20 cm with steel use stainless (SUS) as a collector using a high pressure electric radiator.

The electric radiation may use electric radiation methods commonly used in the art. For example, a dual-nozzle system illustrated in FIG. 4 (Adv. Mater., 2010, 22, 496, herein incorporated by reference) may be used.

A core-shell-shaped tube precursor may be formed by injecting the metal precursor solution and the carbon-based polymer solution to the inner side and the outer side nozzles, respectively, and electric radiating.

The metal precursor solution may be prepared by dissolving a metal precursor and a polymer in a solvent.

Herein, the metal precursor solution may include the metal precursor in 0.1% by weight to 5% by weight, the polymer in 1% by weight to 20% by weight and the solvent in 75% by weight to 95% by weight based upon the total weight of the metal precursor solution.

The metal precursor may be one or more types selected from the group consisting of metal-including alkoxides, acetyl acetates, nitrates, oxalates, halides and cyanides, and specifically, the metal may be one or more types selected from the group consisting of Au, Zn, Mg, Ag, Al, Pt, In, Co, Ni, Mn, Si and Ca.

In addition, when the metal is Au, the precursor of Au may be one or more types selected from the group consisting of $HAuCl_4$, $HAuCl_4 \cdot 3H_2O$, $HAuCl_4 \cdot 4H_2O$, $AuCl_3$ and AuCl.

When the metal precursor is included in less than 0.1% by weight, the metal performing a role of a seed metal for lithium metal growth may not be sufficiently formed inside the structure, and inside the tube may not be filled with lithium metal to a target level, and when the content is greater than 5% by weight, the amount of the formed metal increases with respect to the total weight of the structure, which may relatively reduce the amount of the lithium metal formed inside the structure, and as a result, a cycle life property of a battery may decline.

In addition, the polymer may be one or more types selected from the group consisting of polymethyl methacrylate (PMMA), polyvinyl pyrrolidone (PVP), polyvinyl acetate (PVAc), polyvinyl alcohol (PVA), polystyrene (PS) and polyvinylidene fluoride (PVDF), and polymers capable of being removed at a carbonizing temperature of a carbon-based polymer may be widely used normally.

When the polymer is included in less than 1% by weight, forming tube precursor using electric radiation is difficult, and when the content is greater than 20% by weight, the polymer remains without being sufficiently removed in the first heat treatment thereby declining battery performance.

The solvent may be one or more types selected from the group consisting of methylpyrrolidone (NMP), dimethylformamide (DMF), dimethylacetamide (DMAc), dimethyl sulfoxide (DMSO), tetrahydrofuran (THF) and mixtures thereof.

When the solvent is included in less than 75% by weight, the metal precursor solution may be difficult to prepare, and when the content is greater than 95% by weight, the amounts of the metal precursor and the polymer relatively decrease making it difficult to form the metal inside the structure to a target level.

The carbon-based polymer solution may be prepared by dissolving a carbon-based polymer in a solvent.

The carbon-based polymer may be one or more types selected from the group consisting of polyacrylonitrile (PAN), polyaniline (PANI), polypyrrole (PPY), polyimide (PI), polybenzimidazole (PBI), polypyrrolidone (Ppy), polyamide (PA), polyamide-imide (PAI), polyaramide, melamine, melamineformaldehyde and fluorine mica. Meanwhile, a density of the carbon included in the tube may be from 2.0 g/cm$^3$ to 2.5 g/cm$^3$.

The solvent may be one or more types selected from the group consisting of methylpyrrolidone (NMP), dimethylformamide (DMF), dimethylacetamide (DMAc), dimethyl sulfoxide (DMSO), tetrahydrofuran (THF) and mixtures thereof.

The carbon-based polymer solution may be prepared by dissolving 1% by weight to 20% by weight of the carbon-based polymer in 80% by weight to 99% by weight of the solvent based upon the total weight of the carbon-based polymer solution.

When the carbon-based polymer is included in less than 1% by weight, the weight of the carbon-based polymer may not be sufficient to form the tube and the tube may not be formed after electric radiation, and when the content is greater than 20% by weight, the concentration of the carbon-based polymer solution is excessively high and electric radiation may not be smoothly progressed.

When the solvent is included in less than 80% by weight, the concentration of the carbon-based polymer solution may be excessively high and electric radiation may not be smoothly progressed, and when the content is greater than 99% by weight, a tube form may not be formed after electric radiation.

The solvent used in preparing the metal precursor solution and the carbon-based polymer solution may be the same as or different from each other.

In the step (S2), the tube precursor is first heat treated through heating, and the polymer included in the core of the tube precursor may be removed.

Herein, the heating temperature of the first heat treatment may be from 200° C. to 700° C., and the heat treatment may be carried out while raising a temperature. A metal may be formed by the polymer included in the core of the tube precursor being removed and the metal precursor being reduced while raising a temperature in the first heat treatment.

When the temperature of the first heat treatment is lower than 200° C., the polymer included in the core of the tube precursor may not be removed and the metal precursor may not be reduced as well, and when the temperature is higher than 700° C., a problem of a metal being formed not only on an inner surface of the tube but on an outer surface of the tube may occur since the polymer may all be removed and the metal precursor may all be reduced at 700° C. or lower.

A metal is formed on an inner surface of the tube through such a reduction reaction, and the metal may have a particle form with nano-sized particle sizes of 1 nm to 50 nm.

Meanwhile, the first heat treatment may be carried out under inert atmosphere, and specifically, the inert atmosphere may be formed by one or more types of inert gases selected from the group consisting of Ar, $N_2$, He, Ne and Ne.

In the step (S3), the first heat treated tube precursor is second heat treated through heating, and the shell of the tube precursor may be carbonized to form a tube including carbon.

Herein, the heating temperature of the second heat treatment may be higher than 700° C. and lower than or equal to and 1000° C. When the second heat treating temperature is 700° C. or lower, carbonization may not completely occur, and when the temperature is higher than 1000° C., physical properties of the formed tube may decline due to high temperature treatment.

Particularly, in the second heat treatment, pores controlled in size can be formed in the tube shell at a heating temperature of about 800° C. within a heating temperature range of 700 to 1000° C. For example, in the heating temperature range during the second heat treatment, the pores become smaller as the temperature is higher than 800° C. and the pores become larger as the heating temperature is lower than 800° C. Therefore, the pore size can be controlled by controlling the heating temperature within the heating temperature range.

In the step (S4), lithium metal may be formed inside the tube.

A method of forming lithium metal inside the tube may use one type of method selected from the group consisting of electroplating, electroless plating and deposition, however, the method is not limited thereto, and methods capable of forming lithium metal inside the tube and filling the tube with the lithium metal may be widely used.

A lithium source for forming the lithium metal may be one or more types selected from the group consisting of lithium salts, lithium ingot and lithium metal oxides, but is not limited thereto as long as it is a compound capable of providing lithium ions.

The lithium salt may be one or more types selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. $LiN(CaF_{2a+1}SO_2)(CbF_{2b+1}SO_2)$ (wherein a and b are natural numbers, and preferably 1≤a=20 and 1≤b≤20), LiCl, LiI and $LiB(C_2O_4)_2$.

The lithium metal oxide may be one or more types selected from the group consisting of $LiMO_2$ (M=Co, Ni, Mn), $Li_{1+x}Mn_{2-z}O_4^+$ (0≤x≤0.3) and $LiNi_{1-x}M_xO_2$ (M=Co, Mn, Al, Cu, Fe, Mg, B or Ga, and 0.01≤x≤0.3). For example, the lithium metal oxide may be $LiCoO_2$, $LiNiO_2$, $LiMn_2O_4$, $Li(Ni_aMn_bCo_c)$ $O_2$ (a+b+c=1), $LiNi_{0.5}Mn_{1.5}O_4$ or $LiNi_{0.5}Mn_{0.5}O_2$.

The lithium metal-supported structure prepared as above is used as a negative electrode active material of a lithium metal battery, and is capable of solving problems of lithium metal dendrite formation, a chronic problem of existing lithium metal batteries, and interfacial instability caused therefrom.

The present invention also relates to a lithium secondary battery including an electrode as described above.

The electrode may be a negative electrode or a positive electrode, and depending on the types of an electrode active material supported in the structure, a negative electrode or a positive electrode of a battery may be obtained, and types and supported amounts of a positive electrode active material or a negative electrode active material as the electrode active material are the same as described above.

The structure may form a negative electrode for a lithium metal battery by being dispersed into a negative electrode active layer while either being empty inside or having lithium metal supported therein, and herein, the lithium metal battery may enhance charge and discharge performance and improve stability by morphological characteristics of the structure, a negative electrode active material dispersed into the negative electrode active layer, and the optimized supported amount of the lithium metal.

MODE FOR INVENTION

Hereinafter, preferred examples are provided for illuminating the present invention, however, the following examples are for illustrative purposes only, and it is obvious to those skilled in the art that various changes and modifications may be made within the scope and technological ideas of the present invention, and such changes and modifications also belong to the scope of the appended claims.

Preparation Example 1

Preparation of Tube-Shaped Structure 1-1. Tube Precursor Formation by Electric Radiation A metal precursor solution was prepared by dissolving 0.5% by weight of $HAuCl_4$ (a metal precursor), 11% by weight of PMMA (a polymer), in 88.5% by weight of a solvent. Herein, as the solvent, a mixed solvent mixing dimethylformamide (DMF) and acetone in a weight ratio of 85:15 was used.

A carbon-based polymer solution was prepared by dissolving 13% by weight of PAN (a carbon-based polymer), in 87% by weight of dimethylformamide (DMF) (a solvent).

The metal precursor solution and the carbon-based polymer solution were introduced to an inner nozzle and an outer nozzle, respectively, of a dual-nozzle system including an inner nozzle and an outer nozzle (Adv. Mater., 2010, 22, 496, herein incorporated by reference), and electric radiated to form a tube-shaped structure.

The condition during electric radiation was set as follows.
Relative humidity: 15%
Electric radiating power: 14.5 kV
Radiating solution output (flow rate)
: core=0.9 mL/h (1.3/2 ratio), shell=1.4 mL/h 1-2. Tube Precursor First Heat Treatment and Reduction The tube was first heat treated in a 280° C. furnace to remove PMMA included in a core of the tube precursor, and $HAuCl_4$ was reduced while raising the temperature to form Au particles on an inner surface of the tube precursor shell.

1-3. Second Heat Treatment and Carbonization

After that, PAN of the tube precursor was carbonized at 850° C. to form a tube structure having Au formed on the inner surface thereof.

Preparation Example 2

Preparation of Lithium Metal-Supported Tube-Shaped Structure

Lithium metal was formed inside the tube having Au formed on the inner surface prepared in Preparation Example 1 through electroplating. Herein, $LiClO_4$ (a lithium salt), was used as a lithium source.

Herein, the electroplating was carried out by flowing a current on a lithium half-cell manufactured using a method as below with currently density of 1 $mA/cm^2$.

Negative Electrode Preparation

The structure prepared in Preparation Example 1, Super-P carbon that is a conductor, and PVdF that is a binder were mixed in a weight ratio of 95:2.5:2.5, then the mixture was coated on a Cu current collector, and the result was dried to prepare a negative electrode.

Liquid Electrolyte

As a liquid electrolyte, a liquid electrolyte dissolving 1 M lithium bis-trifluoromethanesulfonimide (LiTFSI) in a mixed solvent of 1,2-dimethoxyethane (DME) and 1,3-dioxolane (DOL) (volume ratio 1:1), and a 1% $LiNO_3$ liquid electrolyte were mixed and used.

Separator

A polyethylene separator was used as a separator.

A lithium half-cell was manufactured using the prepared negative electrode, the polyethylene separator and the liquid electrolyte.

Comparative Preparation Example 1

Preparation of Tube-Shaped Structure not Including Metal (Au)

A tube-shaped structure was prepared in the same manner as in Preparation Example 1, except that the tube-shaped structure did not include a metal (Au).

Example 1

Preparation of Negative Electrode Including Structure in Which Lithium Metal is not Supported 1-1. Preparation of Slurry for Forming Negative Electrode Active Layer Slurry was prepared by dispersing a mixture, which is obtained by mixing 95% by weight of the tube-shaped structure prepared in Preparation Example 1, 2.5% by weight of styrene-butadiene rubber (SBR) (an aqueous binder), and 2.5% by weight of carbon black (a conductor), in dimethyl sulfoxide (DMSO) (a solvent), wherein a weight ratio of the mixture and the solvent was 1:1.

1-2. Formation of Film for Forming Negative Electrode Active Layer

A film for forming a negative electrode active layer was formed by coating the slurry prepared in 1-1 above on Cu foil (a negative electrode current collector), with a loading amount of 2.6 $mAh/cm^2$ using spin coating.

1-3. Preparation of Negative Electrode

A negative electrode was formed by heating the film formed in 1-2 for 2 hours at 110° C., and drying and rolling the result.

Example 2

Preparation of Negative Electrode Including Structure in which Lithium Metal is Supported A negative electrode was prepared in the same manner as in Example 1, except that the tube-shaped structure in which lithium metal is supported prepared in Preparation Example 2 was used.

Comparative Example 1

Bare Cu foil was prepared.

Comparative Example 2

A negative electrode was prepared in the same manner as in Example 1, except that the tube-shaped structure that does not include a metal prepared in Comparative Preparation Example 1 instead of Preparation Example 1 was used.

Comparative Example 3

A negative electrode having lithium foil formed on bare Cu foil was prepared.

Preparation Example 3

Manufacture of Lithium Half-Cell

Negative Electrode

The negative electrode each prepared in Example 1 and Comparative Examples 1 and 2 was prepared.

Liquid Electrolyte

As a liquid electrolyte, a liquid electrolyte dissolving 1 M lithium bis-trifluoromethanesulfonimide (LiTFSI) in a mixed solvent of 1,2-dimethoxyethane (DME) and 1,3-dioxolane (DOL) (volume ratio 1:1), and a 1% $LiNO_3$ liquid electrolyte were mixed and used.

Separator

A polyethylene separator was used as a separator.

A lithium half-cell was manufactured using the prepared negative electrode, the polyethylene separator and the liquid electrolyte.

Test Example 1

Test on Charge and Discharge Property

Charge and discharge were performed on the lithium half-cell prepared in Preparation Example 3 using each of the electrodes of Example 1 and Comparative Examples 1 and 2. The charge and discharge test was carried out at a current density of 1 $mAh/cm^2$ with a discharge capacity of 1 $mAh/cm^2$, a charging voltage of 1V cut-off.

FIGS. 5a to 5c show graphs of charge and discharge test results for the lithium half-cells manufactured using the electrodes of Example 1 and Comparative Examples 1 and 2.

When referring to FIGS. 5a to 5c, it was seen that the lithium half-cell manufactured using the electrode prepared in Example 1 included the tube-shaped structure of Preparation Example 1 and did not exhibit a capacity decrease up to 300 cycles.

Test Example 2

Observation on Form Changes of Structure Depending on Charge and Discharge

Shape changes of the tube-shaped structure in the lithium half-cell manufactured using the electrode prepared in Example 1 were observed before the charge and discharge property test (pristine) and when charged and discharged as in Test Example 1.

FIG. 6 shows transmission electron microscope (TEM) images observing form changes of the lithium half-cell manufactured using the electrode of Example 1 before and after charge and discharge (Pristine: before charge and discharge; $20^{th}$D: after $20^{th}$ discharge; $20^{th}$C: after $20^{th}$ charge).

When referring to FIG. 6, it was seen that Au having particle sizes of 15 nm to 20 nm was uniformly dispersed on the inner surface of the tube of the tube-shaped structure before charge and discharge. In addition, it was seen that lithium metal first bonded to Au inside the tube to form a $Li_xAu$ (x is a real number of $0 \leq x \leq 3.75$)-type alloy when charged and discharged, and particularly, the lithium metal was only formed inside the tube and escaped after $20^{th}$ charge and discharge.

Test Example 3

Observation on Form of Lithium Metal Growth

A shape of lithium metal growth was observed after $20^{th}$ charge in the charge and discharge property test of Test Example 1.

FIG. 7 shows scanning electron microscope (SEM) images observing a form of lithium metal growth when charging and discharging the lithium half-cells manufactured using the electrodes of Example 1 and Comparative Examples 1 and 2.

When referring to FIG. 7, it was seen that, in the tube-shaped structure included in the lithium half-cell manufactured using the electrode prepared in Example 1, lithium metal dendrite was formed less compared to Comparative Examples 1 and 2 after $20^{th}$ charge.

Hereinbefore, the present invention has been described with reference to limited embodiments and drawings, however, the present invention is not limited thereto, and various modifications and changes may be made by those having common knowledge in the technology field to which the present invention belongs within technological ideas of the present invention and the scope of equivalents of the appended claims.

REFERENCE NUMERAL

100: Electrode
1: Electrode Active Layer
2: Current Collector
10: Structure
11: Tube
$D_{ex}$: Tube Outer Diameter
$D_{in}$: Tube Inner Diameter
12: End of Tube (tube may have two ends)
13: Metal
14: Electrode Active Material
15: Cavity

The invention claimed is:

1. An electrode comprising:
   a current collector; and
   an electrode active layer comprising a structure for supporting an electrode active material, formed on the current collector,
   wherein the structure comprises a tube having one side surface or both side surfaces open; and a metal comprised on an inner surface of the tube,
   wherein the electrode active material is lithium metal as a negative electrode active material,
   wherein the lithium metal is formed inside the tube having the metal formed on the inner surface of the tube,
   wherein the tube comprises carbon,
   wherein the tube has a length, an inner diameter ($D_{in}$) and outer diameter ($D_{ex}$), and
   wherein the inner diameter ($D_{in}$) of the tube ranges from 0.1 µm to 1.8 µm, the length of the tube ranges from 2 µm to 25 µm, and the outer diameter ($D_{ex}$) of the tube ranges from 0.2 µm to 2 µm, and
   wherein the tube has a longitudinal section aspect ratio (a) of greater than 1 by the following Equation 1:

$$a = L/D_{ex}$$ [Equation 1]

in Equation 1, L is the length of the tube and $D_{ex}$ is the outer diameter of the tube.

2. The electrode of claim 1, wherein the current collector is one or more selected from the group consisting of copper, stainless steel, aluminum, nickel, titanium and baked carbon.

3. The electrode of claim 1, wherein the electrode active layer further comprises a binder and a conductor.

4. The electrode of claim 3, wherein the electrode active layer comprises the structure in 80% by weight to 99.5% by weight, the binder in 0.3% by weight to 19.8% by weight and the conductor in 0.2% by weight to 19.7% by weight.

5. The electrode of claim 3, wherein the binder is one or more aqueous binder selected from the group consisting of acrylate-based rubber and styrene-based rubber.

6. The electrode of claim 3, wherein the conductor is one or more selected from the group consisting of carbon black, acetylene black, Ketjen black, channel black, furnace black, lamp black, thermal black and carbon fiber.

7. The electrode of claim 1, wherein the carbon of the tube is porous.

8. The electrode of claim 1, wherein the metal is present in 0.1% by weight to 25% by weight with respect to a total weight of the structure.

9. The electrode of claim 1, wherein the metal has a particle diameter of 1 nm to 50 nm.

10. The electrode of claim 1, wherein the metal is a metal having a lower overvoltage with an electrode active material compared to an electrode current collector; or a metal having a multiphase with an electrode active material.

11. The electrode of claim 1, wherein the metal is one or more metal selected from the group consisting of Au, Zn, Mg, Ag, Al, Pt, In, Co, Ni, Mn, Si and Ca.

12. The electrode of claim 1, wherein a volume ratio (a) of the lithium metal with respect to a free volume of the tube is 0≤α≤1 by the following Equation 2:

$$\alpha = V_{Li}/V_F$$ [Equation 2]

in Equation 2, $V_F$ is a free volume of the tube and $V_{Li}$ is a volume of the lithium metal, and the $V_F$ is calculated by the following Equation 3:

$$V_F = \pi(D_{in}/2)^2 L$$ [Equation 3]

in Equation 3, $D_{in}$ is the inner diameter of the tube and L is the length of the tube.

13. A lithium secondary battery comprising:
    the electrode of claim 1;
    an opposing electrode; and
    an electrolyte disposed between the electrode and opposing electrode.

14. The electrode of claim 1, wherein the lithium metal is prepared by electroplating.

* * * * *